M. P. JACKSON & A. D. MAXWELL.
MACHINE FOR LOADING COTTON.
APPLICATION FILED DEC. 7, 1907.
902,410.
Patented Oct. 27, 1908.
3 SHEETS—SHEET 1.
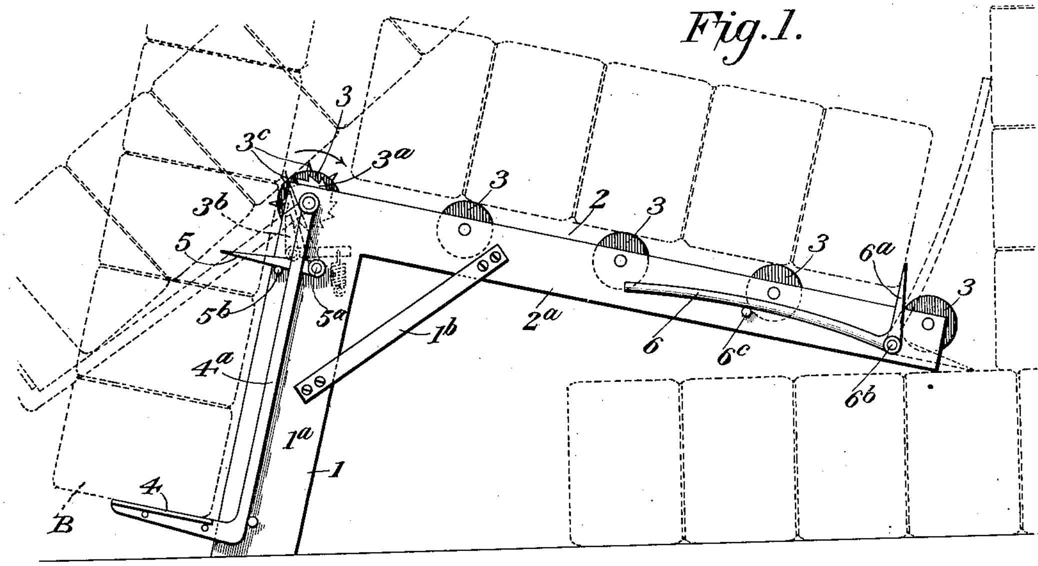
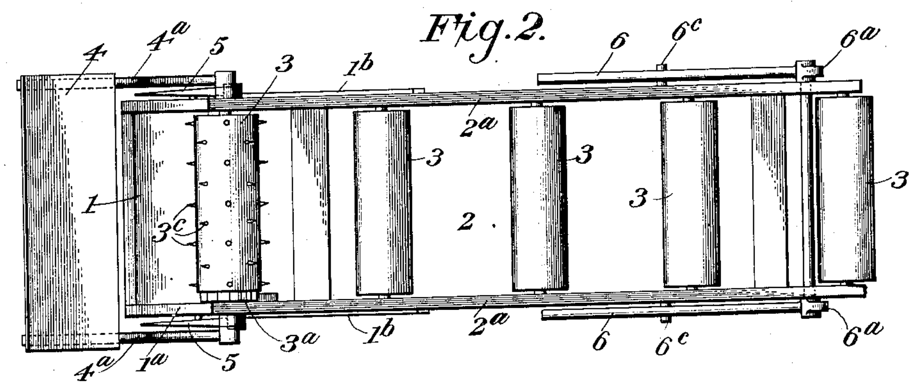
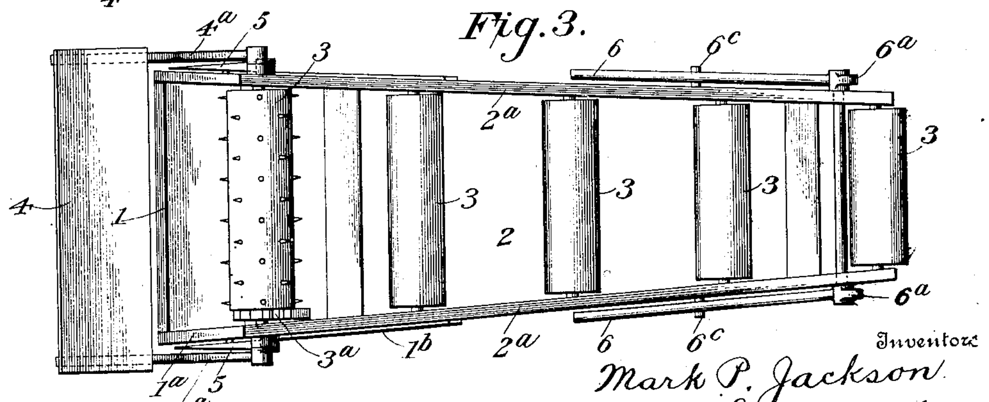
Witnesses
M. E. Fowler
James R. Mansfield.
Inventors
Mark P. Jackson
Audley D. Maxwell.
By Alexander & Dowell
Attorneys.

M. P. JACKSON & A. D. MAXWELL.
MACHINE FOR LOADING COTTON.
APPLICATION FILED DEC. 7, 1907.
902,410. Patented Oct. 27, 1908.
3 SHEETS—SHEET 2.
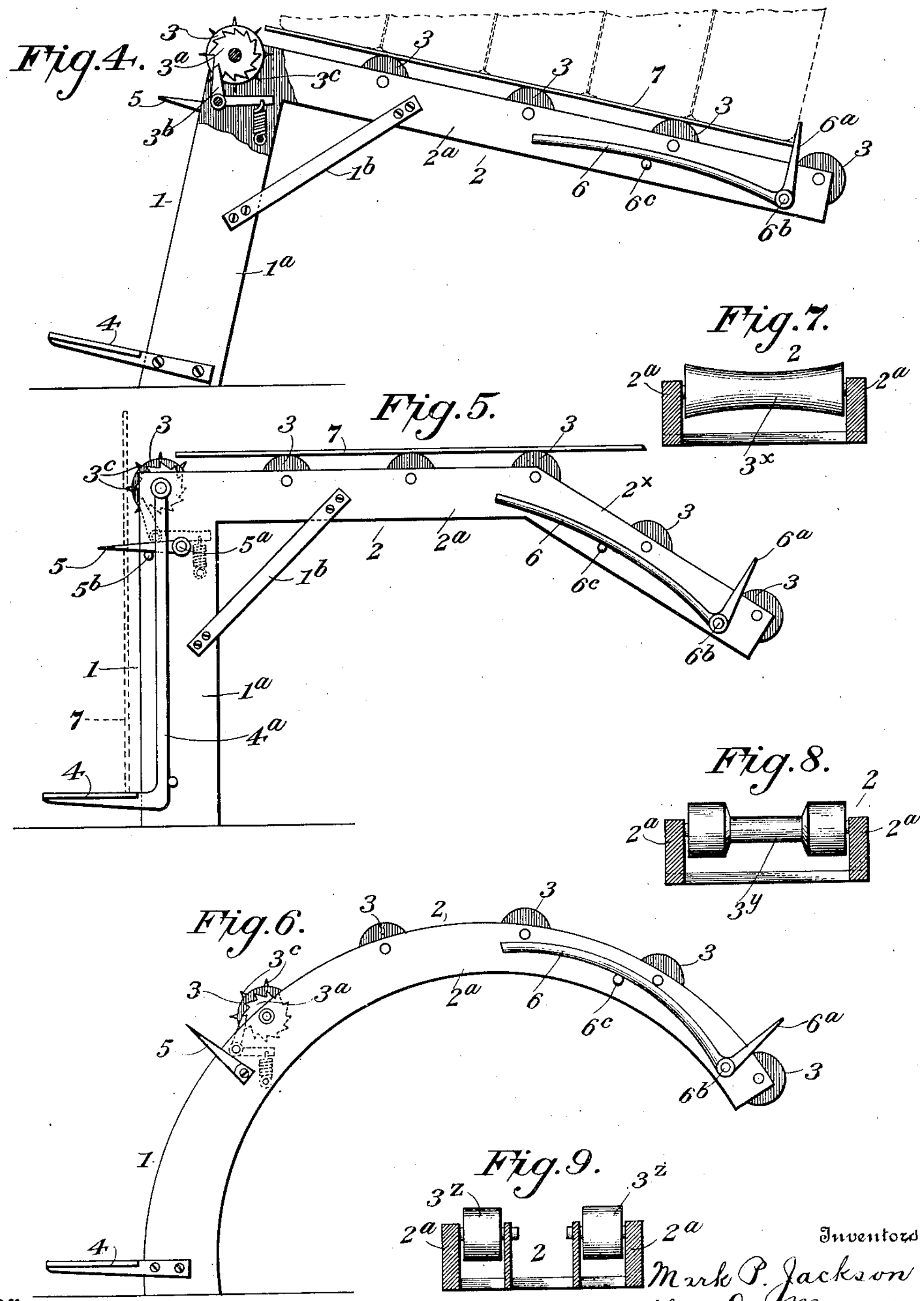
Witnesses
M. E. Fowler
James R. Mansfield.
Inventors
Mark P. Jackson
Audley D. Maxwell.
By Alexander & Dowell
Attorneys M. P. JACKSON & A. D. MAXWELL.
MACHINE FOR LOADING COTTON.
APPLICATION FILED DEC. 7, 1907.
902,410. Patented Oct. 27, 1908.
3 SHEETS—SHEET 3.
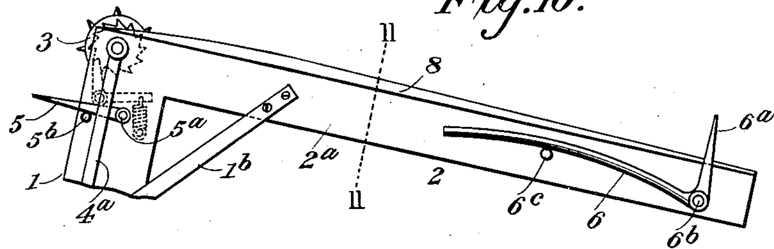
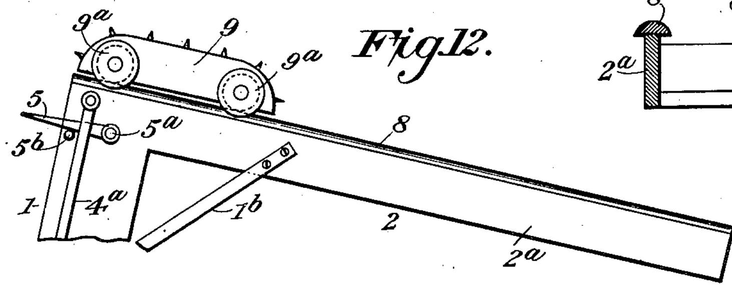
Fig.11.
8 8 2a 2a 2
Fig.13.
B4 B3 B2 3c 3 3 2 5 1 1b 2a 6 6c 6a 3 6b 1a 4a 4 B1 B
Inventors
Mark P. Jackson.
Audley D. Maxwell.
Witnesses
M. E. Fowler
James R. Mansfield.
By Alexander & Dowell
Attorneys

UNITED STATES PATENT OFFICE.

MARK P. JACKSON AND AUDLEY D. MAXWELL, OF MONTEZUMA, GEORGIA.

MACHINE FOR LOADING COTTON.

No. 902,410. Specification of Letters Patent. Patented Oct. 27, 1908.

Application filed December 7, 1907. Serial No. 405,516.

*To all whom it may concern:*

Be it known that we, MARK P. JACKSON and AUDLEY D. MAXWELL, both of Montezuma, Macon county, Georgia, have invented certain new and useful Improvements in Machines for Loading Cotton; and we hereby declare that the following is a full, clear, and exact description thereof, reference being had to the accompanying drawings, which form part of this specification.

This invention is a novel machine for use in loading bales of cotton, and the like bulky packages, in box-cars, holds of vessels, warehouses, etc., and is especially designed to facilitate the placing of the bales in proper position with less manual effort than has hitherto been necessary.

The machine comprises a portable skidding frame or truck which can be readily run into a box-car, a vessel, or ware-house, wherever it is desired to stack the bales, and by aid of which the bales can be easily piled or stacked in the manner hereinafter described. The use of such machine greatly expedites the work of packing or storing the bales, and materially lessens the amount of manual labor required in so doing.

In the drawings we have shown various modifications of the machine embodying the invention, and such as would readily suggest themselves to skilled mechanics when the invention is once disclosed, but other modifications of construction or form may suggest themselves to others which will embody the essential features of the invention as set forth in the claims following the description of the machines illustrated in the drawings,—and to which we refer for summaries of the parts and combinations of parts for which protection is desired.

In said drawings—Figure 1 is a side elevation of the preferred form of the machine showing various attachments thereto. Fig. 2 is a plan view of Fig. 1. Fig. 3 is a similar view of a slight modification. Figs. 4, 5 and 6 are side views illustrating slight modifications in the form of the machine. Figs. 7, 8 and 9 are detail sectional views illustrating various forms of rollers which may be used in the machine. Fig. 10 is a detail side view showing a machine provided with rails in lieu of rollers. Fig. 11 is a section on line 11—11, Fig. 10. Fig. 12 is a detail view showing a carriage mounted on the rails. Fig. 13 is a view illustrating the method of using the machine in packing cotton bales in a car.

As shown in Fig. 1 the machine comprises an angular main frame, having a front receiving-portion 1, which is slightly inclined from the perpendicular, and a delivery-portion 2, which is connected to the upper end of part 1 and preferably inclines downwardly therefrom as shown.

The part 1 may be composed of side uprights $1^a$, $1^a$, of wood or metal, suitably connected and braced, and the part 2 may be similarly constructed of side pieces $2^a$, $2^a$ suitably connected and braced. The part 2 is preferably considerably longer than the part 1 is high. The parts 1 and 2 may be stiffened by intermediate braces $1^b$ at their junctions, as shown.

As shown in Figs. 1 to 6, the delivery part 2 is provided with a series of transversely disposed rollers 3, the trunnions of which are suitably journaled in the side pieces $2^a$ of part 2, and their upper peripheries project above the side pieces sufficiently to support a bale of cotton, or other material laid thereupon, as indicated in the drawings. The front roller at the outer end of part 2 and upper end of part 1, is preferably provided with a ratchet wheel $3^a$ on one end, which is engaged by a spring controlled pawl $3^b$, so that backward rotation of the said roll will be prevented, as said roll can rotate only in the direction of the arrow in Fig. 1. This roll may be provided with spuds or pins $3^c$ on its periphery to catch on the bale and prevent the latter slipping backward on the roll when once started thereover, as indicated in Figs. 1 and 13. Preferably a platform 4 is connected to the front portion 1, and lies normally near its lower end, so that a bale B can be easily up-ended upon this platform, as shown. Preferably this platform 4 is connected to the part 1 so as to swing relatively thereto, and as shown in Fig. 1 is attached to the ends of bars $4^a$, the upper ends of which may be pivoted on the trunnions of the front roll 3, or on other suitable pivots attached to part 1, so that after the bale is on the platform 4, it can be easily tilted upon and over the front roller 3, as indicated in Figs. 1 and 13, and onto the part 2, as indicated in Fig. 13.

In some cases the platform 4 may be rigidly attached to the part 1, as shown in Figs. 4-6, in which case the bale will have to be lifted off the platform when up-ending it onto the part 2.

Spuds 5 may be attached to the sides of part 1 below the roller, as shown. These spuds are adapted to prevent the bale slipping back as it is turned over the upper end of part 1 onto part 2. The spuds may be pivoted to the part 1, as indicated at $5^a$ in Fig. 1, or may be fixed thereto, as indicated in Figs. 4–6. When pivoted to the part 1, stops $5^b$ should be provided to prevent the studs dropping below the receiving position.

To the rear end of part 2 we preferably attach a detaining device comprising a bell crank lever, or a pair of similar levers, one at each side of the frame and connected if desired; which levers are pivoted at their bends to the sides of part 2, as indicated at $6^b$, the long arms 6 of said levers normally lying down beside the part 2, as indicated in Fig. 1, and resting upon stop-pins $6^c$, while the short arms $6^a$ of said levers project up above the part 2, adjacent the last roller, in position to engage the inner end of the bale and arrest it, as indicated in dotted lines Fig. 1. But when the bale is ended up, its weight coming upon arms $6^a$ causes the long arms 6 to move it on clear of the end roller or part 2, and deposit it in the desired position, as indicated in Fig. 13, the short arms $6^a$ disappearing below the upper edges of part 2 as shown in Fig. 13. This device prevents the bale running too far off the delivery part of the frame, and enables the bale to be set upright in the desired position without dragging upon a preceding bale.

The part 2 may be made with parallel sides, as shown in Fig. 2, or it may be made slightly tapering, as shown in Fig. 3. The rollers 3 may be cylindric, as shown in Figs. 1, 2 and 3, or may be concaved, as at $3^x$, in Fig. 7, or spool-shaped, as at $3^y$, in Fig. 8. As shown in Fig. 9, two series of rollers $3^z$ may be arranged at opposite sides of part 2, instead of having the rollers extend clear across the frame.

If desired a carrier board 7 may be used; this board would be set upon platform 4 and against part 1 before the bale is up-ended thereon, and then when the bale is tipped onto part 2 the board 7 will support it upon the rollers 3, as indicated in Figs. 4 and 5.

The parts 1 and 2 might be formed continuous, in a curved or arc-shaped frame, as in Fig. 6, rather than a rectangle, the other parts in such machine similar to those already described being similarly lettered.

Instead of using rollers on part 2, the latter may be provided with polished bars or rails 8, as shown in Figs. 10 and 11, upon which rails the bale can slide easily, or be easily moved, after it is tilted over upon the part 2.

A small truck 9 having wheels $9^a$ adapted to run upon the tracks or rails 8 on part 2, may be employed, as indicated in Fig. 12, to carry the bale upon part 2. Again the rear part $2^x$ or part 2 may be bent downward at an angle to the other part thereof, as shown in Fig. 5. All the described forms or modifications shown and described, and others which may suggest themselves to those skilled in the art, are capable of use for handling and storing bales of cotton and the like, in the following manner.

Operation. Assuming that a box-car is to be filled, a layer of bales B is laid flat upon the floor of the car, as indicated in Figs. 1 and 13, then the machine is run into the car and arranged as shown in Fig. 13, with the part 2 overlying the said layer of bales B. Then a bale is run in and ended up on platform 4, as indicated in dotted lines B′ in Fig. 13. Then said bale is raised and tilted over upon part 2, as indicated in dotted lines $B^2$ Fig. 13. The shifting of the bale onto part 2 is facilitated by the described devices to prevent backward movement thereof, such as the ratchet-roller and the spuds. The bale eventually drops upon part 2 and descends thereon to the position indicated in dotted lines $B^3$, Fig. 13. Then it is up-ended to the position indicated in dotted lines $B^4$, Fig. 13, against the end of the car, and upon the underlying bales. The machine is shifted after each bale is in position, and the bales are stood up side by side upon the layer of bales B, until the car is filled.

By use of this machine it will be seen that the bales can be practically carried over the underlying bales to position for ending-up thereon, without any dragging or frictional contact therewith, and without the workman having to manually or bodily lift the bale at any time, the principal coming only in tilting the bale over upon the delivery-portion 2.

The machine can be constructed strong and light, so that it can be easily handled by one man, and with this machine two men can store and pack an equal or larger number of bales in a given time more easily and quickly than can ordinarily be done by four or more men, and with less exertion.

Having described our invention what we claim as new and desire to secure by Letters Patent is:

1. A machine for use in storing cotton bales and the like, having a substantially vertical receiving portion, and a delivery portion connected to the upper end of the receiving portion and adapted to project over an underlying bale, the free end of the delivery portion being lower than its receiving end.

2. A machine for use in storing bales of cotton and the like having a receiving portion, a delivery portion extending away from the receiving portion and connected with the upper part thereof, said delivery portion being provided with devices to facilitate the movement of the bale thereupon; with devices for facilitating the tilting of a bale from the receiving portion onto the delivery portion.

3. A machine for use in storing cotton bales and the like, having a substantially vertical receiving portion, and a delivery portion connected to the upper end of the receiving portion and adapted to project over an underlying bale, the free end of the delivery portion being lower than its receiving end, devices for facilitating the tilting of a bale from the receiving portion onto the delivery portion, and devices on the delivery portion to facilitate the movement of the bale thereupon.

4. A portable machine for use in storing bales of cotton and the like, comprising a substantially vertical receiving portion provided with a platform upon which the bale is up-ended, a downwardly inclined delivery portion connected to the upper end of the receiving portion and onto which the bale is tipped, and means to prevent backward slipping of the bale while being tipped onto the delivery portion.

5. A portable machine for use in storing bales of cotton and the like, comprising a substantially vertical receiving portion provided with a platform, a downwardly inclined delivery portion connected to the upper end of the receiving portion, devices on the delivery portion to facilitate the movement of the bale thereon, and means to prevent backward slipping of the bale while being tipped onto the delivery portion.

6. A machine for the purpose described, comprising a receiving portion, a downwardly inclined delivery portion connected to the upper end of the receiving portion, devices on the delivery portion to facilitate the movement of the bale thereon, and detaining devices attached to the lower end of the delivery portion.

7. A machine for the purpose described having a receiving frame and a downwardly inclined delivery frame connected to the upper end of the receiving frame, said delivery frame being provided with means to facilitate the descent of an object thereupon, and devices at the junction of the two frames to prevent backward slipping of a bale while being tilted from the receiving frame onto the delivery frame.

8. A machine for the purpose described, comprising a substantially vertical receiving frame, a downwardly inclined delivery frame, and a roller at the junction of the said parts, and a ratchet and pawl to prevent backward rotation of the roller.

9. A machine for the purpose described, having a receiving frame and a downwardly inclined delivery frame connected to the upper end of the receiving frame, and provided with rollers to facilitate the descent of an object thereupon, and a spudded roller at the junction of the frames to prevent backward slipping of a bale while being tilted from the receiving frame onto the delivery frame.

10. A portable machine for storing bales of cotton, and the like, comprising a substantially vertical receiving portion provided with a platform upon which the bale is up-ended, a downwardly inclined delivery portion connected to the upper end of the receiving portion and onto which the bale is tipped, devices on the delivery portion to facilitate the movement of the bale thereon, means to prevent backward slipping of the bale while being tipped onto the delivery portion, and detaining levers pivoted to the lower end of the delivery portion.

11. A machine for the purpose described, comprising a substantially vertical receiving frame, a downwardly inclined delivery frame, and a swinging platform attached to the receiving frame.

12. A machine for the purpose described, comprising a substantially vertical receiving frame, a downwardly inclined delivery frame, a roller at the junction of the said frames, means to prevent backward rotation of the roller, and a swinging platform attached to the receiving frame.

13. A machine for the purpose described comprising a substantially vertical receiving frame or part, a downwardly inclined delivery frame or part, a bale detaining device at the discharge end of the delivery frame, and a swinging platform attached to the receiving frame.

14. A machine for the purpose described comprising a substantially vertical receiving frame, a downwardly inclined delivery frame, a roller at the junction of the said frames, a ratchet to prevent backward rotation of the roller, a bale detaining device at the discharge end of the delivery frame, and a swinging platform attached to the receiving frame.

15. A machine for storing bales comprising a substantially perpendicular receiving part, and a downwardly inclined delivery part connected to the upper end of the receiving part, a series of rollers mounted on the delivery part, and means at the junction of the delivery and receiving parts to prevent backward slipping of a bale.

16. A machine for the purpose described comprising a substantially perpendicular receiving frame, and a downwardly inclined delivery frame connected to the upper end of the receiving frame, a series of rollers mounted on the delivery frame, a spudded roller at the junction of the said frames, and means to prevent backward rotation of said roller.

17. A machine for use in storing bales, comprising a substantially perpendicular receiving part, and a downwardly inclined delivery part connected to the upper end of the receiving part, a series of rollers mounted on the delivery part, means at the junction of the delivery and receiving parts to prevent backward slip of a bale, a platform connected to the receiving portion by swinging supports, and a bale detaining device at the discharge end of the delivery part.

18. A machine for the purpose described, comprising a substantially perpendicular receiving frame, and a downwardly inclined delivery part or frame connected to the upper end of the receiving frame, a series of rollers mounted on the delivery frame, a spudded roller at the junction of the delivery and receiving frames, means to prevent backward rotation of said roller, a platform connected to the receiving portion by swinging supports, and bale detaining levers pivoted to the discharge end of the delivery frame.

In testimony that we claim the foregoing as our own, we affix our signatures in presence of two witnesses.

MARK P. JACKSON.
AUDLEY D. MAXWELL.

In presence of—
J. B. EASTERLIN, Jr.,
THOS. A. DIXON.